(12) United States Patent
Fesl

(10) Patent No.: US 8,939,450 B2
(45) Date of Patent: Jan. 27, 2015

(54) MECHANICAL SEAL ASSEMBLY WITH COMPENSATION ELEMENT

(75) Inventor: Andreas Fesl, Otterfing (DE)

(73) Assignee: EagleBurgmann Germany GmbH & Co., KG, Wolfratshausen (DE)

( * ) Notice: Subject to any disclaimer, the term of this patent is extended or adjusted under 35 U.S.C. 154(b) by 450 days.

(21) Appl. No.: 13/383,448

(22) PCT Filed: Jul. 20, 2010

(86) PCT No.: PCT/EP2010/004439
§ 371 (c)(1),
(2), (4) Date: Feb. 10, 2012

(87) PCT Pub. No.: WO2011/009596
PCT Pub. Date: Jan. 27, 2011

(65) Prior Publication Data
US 2012/0133099 A1    May 31, 2012

(30) Foreign Application Priority Data
Jul. 23, 2009 (DE) .................... 20 2009 010 044 U

(51) Int. Cl.
*F16J 15/38* (2006.01)
*F16J 15/34* (2006.01)
(52) U.S. Cl.
CPC .................. *F16J 15/3464* (2013.01)
USPC ...................................... 277/390
(58) Field of Classification Search
CPC ..... F16J 15/34; F16J 15/3456; F16J 15/3444; F16J 15/3452; F16J 15/3464; F16J 15/3476

USPC .................. 277/370–371, 390, 396
See application file for complete search history.

(56) References Cited

U.S. PATENT DOCUMENTS 3,124,502 A * 3/1964 Radke .......................... 428/66.4
4,114,900 A * 9/1978 Wiese ........................... 277/364
4,145,059 A * 3/1979 Imai et al. ...................... 277/360
(Continued)

FOREIGN PATENT DOCUMENTS

DE        6904740 U    6/1969
DE        2408452 A1   8/1974
(Continued)

OTHER PUBLICATIONS

International Search Report issued Oct. 14, 2010 for PCT/EP2010/004439.
(Continued)

*Primary Examiner* — Vishal Patel
(74) *Attorney, Agent, or Firm* — Edwards Wildman Palmer LLP; Scott D. Wofsy; Joshua L. Jones

(57) ABSTRACT

The invention relates to a mechanical seal assembly for sealing between a high pressure region and a low pressure region, comprising: a stationary seal ring connected to a stationary component, a rotating seal ring connected to a rotating component, a divided power absorption ring arranged at the rotating component, and a compensation ring unit comprising a first ring, a second ring and a third ring, wherein the first ring and the second ring have a higher strength than the third ring, and wherein the compensation ring unit is arranged in the force path between the high pressure region and the divided power absorption ring.

10 Claims, 2 Drawing Sheets

(56) References Cited

U.S. PATENT DOCUMENTS

Figure 1:
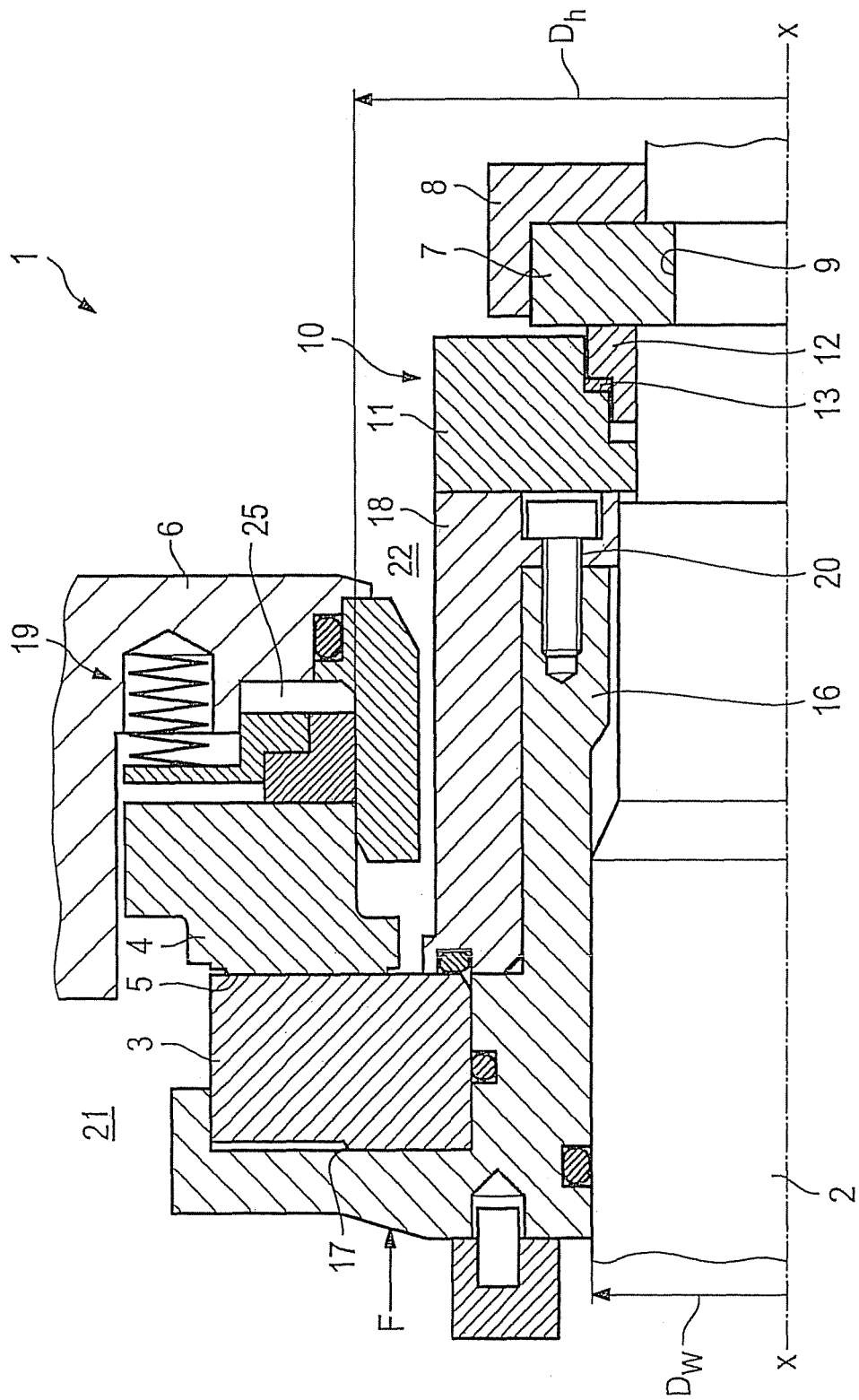

| | | | |
|---|---|---|---|
| 4,768,790 | A | 9/1988 | Netzel et al. |
| 5,388,843 | A | 2/1995 | Sedy |
| 5,533,739 | A | 7/1996 | Sedy |
| 6,305,693 | B1 * | 10/2001 | Wehrle .......................... 277/377 |
| 7,029,012 | B2 * | 4/2006 | Roddis .......................... 277/370 |
| 2008/0042364 | A1 * | 2/2008 | Zheng et al. .................. 277/378 |

FOREIGN PATENT DOCUMENTS

| | | |
|---|---|---|
| DE | 3428744 A1 | 2/1985 |
| JP | S5671552 U | 6/1981 |

OTHER PUBLICATIONS

German Search Report issued Apr. 8, 2010 for DE202009010044.8.
Office Action issued on Mar. 19, 2013 for JP 2012-520947.

* cited by examiner

MECHANICAL SEAL ASSEMBLY WITH COMPENSATION ELEMENT

The present invention refers to a mechanical seal assembly comprising a compensation element for waviness, in particular in mechanical seal assemblies charged with high pressure.

In case of high-pressurized mechanical seal assemblies, such as e.g. in high-pressure gas seals with pressures above $200 \times 10^5$ Pa, a divided ring is arranged at the rotating shaft for absorbing the enormous axial forces. This divided ring is usually arranged in a shaft groove and enclosed by a L-section ring, such that a so-called "detachable shaft shoulder" is formed. Due to the division of this divided ring, a flatness is no longer provided when the axial force acts onto the divided ring, such that distortions can result up to a rear abutting surface of the rotating seal ring or the seal ring itself. This may lead to leakage in the mechanical seal assembly. Further, it may happen that the divided ring, due to its division, deforms non-uniformly as a result of the enormous axial force, such that this deformation may push through onto the surface of the stationary seal ring. This results in wear tracks on the sliding surface, which also lead to undesired problems of leak tightness. In order to prevent such a pushing-through of the division onto the sliding surfaces, this problem has been solved up to now by enlarging the sealing gap between the sliding surfaces. However, this results in an undesired higher leakage rate.

It is therefore an object underlying the present invention to provide a mechanical seal assembly which enables the use of a divided power absorption ring without occurrence of leakage problems at the mechanical seal assembly, while having a simple structure and being manufactured easily and at low costs.

This object is solved by a mechanical seal assembly having the features of claim 1, the sub-claims show preferred further embodiments of the invention.

The inventive mechanical seal assembly having the features of claim 1 has the advantage that a divided power absorption ring can be used at a rotating component without occurrence of distortions or indentations of the division on the seal ring or other components. According to the invention, a compensation ring unit is provided, which comprises a first ring, a second ring and a third ring. The third ring is arranged between the first ring and the second ring and the first and second rings have a higher strength than the third ring. Due to the different strength of the three rings of the compensation ring unit, a distortion due to the use of the divided power absorption ring at the rotating component is absorbed by compensating possibly occurring distortions by the softer third ring (intermediate ring). This means that the third ring is loaded beyond its strength limit if, upon very high pressures, a large axial force acts on the divided ring, such that the third ring experiences a plastic deformation and thus compensates the distortions. Consequently, a divided power absorption ring which can be easily mounted can be used even at very high pressures, since the compensation ring unit is arranged in the force path between the divided power absorption ring and the high-pressure region.

Preferably, the first ring has a first surface and the second ring has a second surface, wherein the two surfaces are facing each other in the axial direction and wherein the two surfaces are directly contacting the third ring. Therewith, a sufficient surface pressure is obtained between the first or second ring and the third ring.

Preferably, the strength of the first and second rings of the compensation ring unit is equal. Particularly preferably, the first and second rings are made of the same material. In this context, it shall be noted that it is further preferred to use a tensile strength of the three rings as a reference for determining an amount for the strength.

Particularly preferred, the first ring and the second ring respectively comprise a step, wherein the third ring is arranged in the axial direction between the steps of the first and second rings. Therewith, a particular compact structure can be realized.

Preferably, a minimum inner diameter of the first ring is equal to a minimum inner diameter of the second ring. Therewith, a simple assembly of the compensation ring unit is enabled on the one hand and, on the other hand, there results a simple and compact structure.

Particularly preferred, the compensation ring unit is structured such that the first ring and the second ring are connected to each other only by surfaces facing each other in the axial direction through the third ring. Therewith, it may be secured that none of the surfaces of the first and second rings, which surfaces are facing each other in the axial direction, are in direct contact, but only through the third ring. Therewith, the third ring can optimally fulfil its compensation function in case of a high axial load.

In order to always guarantee a possibly required deformation of the third ring in different operating states, a surface pressure between the first ring and the third ring and/or between the second ring and the third ring is preferably higher than a yield limit of the third ring. Simultaneously, the surface pressure is also smaller than or equal to a half yield limit of the first or second ring. In this context, the surface pressure exists between the third ring and the first or second ring, respectively, when the axial force occurs.

Further preferred, the third ring formed as an intermediate ring is preferably made of aluminium or a material containing aluminium and/or the first and second rings are made of steel.

The mechanical seal assembly according to the invention is preferably used in high-pressure gas applications in which pressures above $200 \times 10^5$ Pa occur.

Figure 2:
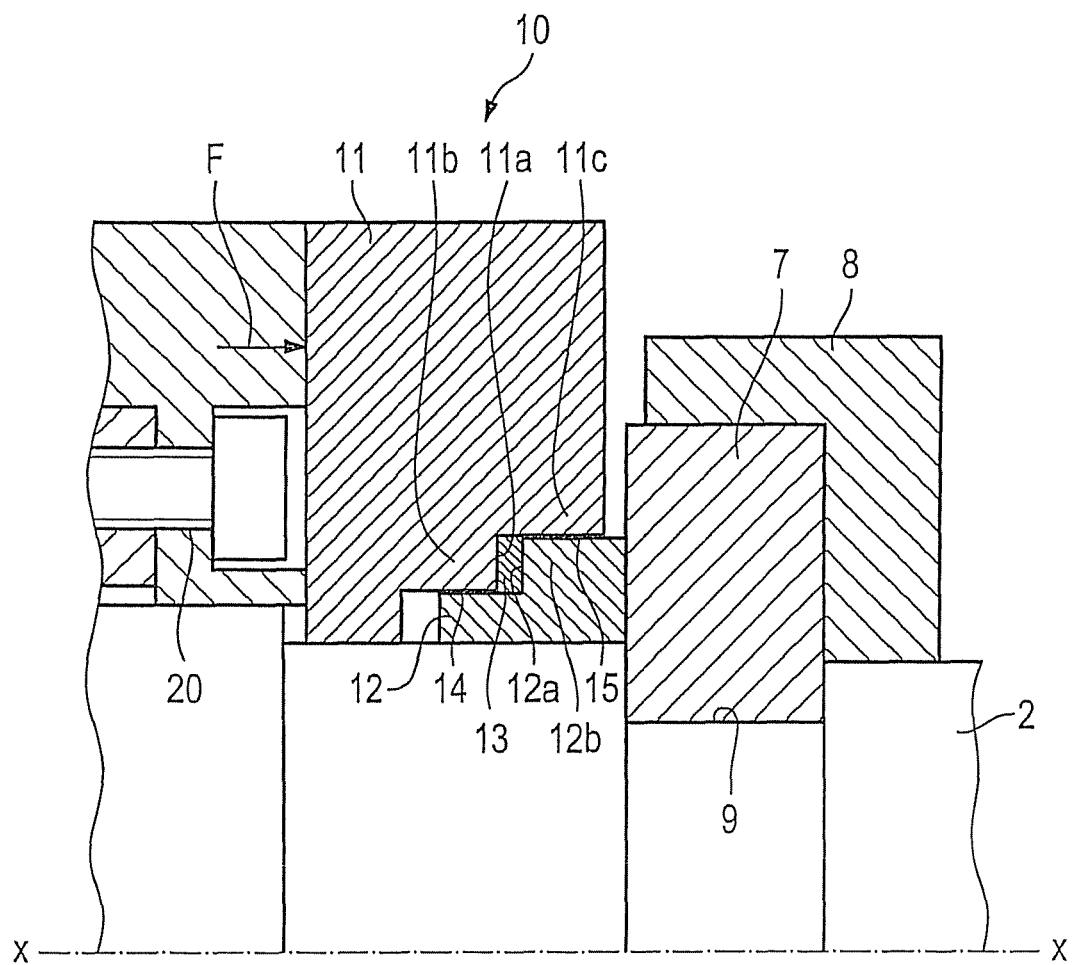

In the following, an embodiment of the invention is described in detail with reference to the accompanying drawing, in which:

FIG. 1 shows a schematic, view of a mechanical seal assembly according to a first embodiment of the invention, and FIG. 2 shows an enlarged view of the compensation ring unit shown in FIG. 1.

In the following, a mechanical seal assembly 1 according to a first preferred embodiment of the invention is described in detail with reference to FIGS. 1 and 2.

FIG. 1 shows the schematic structure of a mechanical seal assembly 1 according to a preferred embodiment of the invention, which seals a high-pressure region 21 against a low-pressure region 22. The mechanical seal assembly 1 is arranged at a rotating shaft 2 and comprises a rotating seal ring 3 and a stationary seal ring 4, wherein a sealing gap 5 is formed between them. The stationary seal ring 4 is connected to a housing 6. Reference numeral 19 designates a pre-tensioning unit for axially pre-tensioning the stationary seal ring 4.

Further, a divided power absorption ring 7 is provided which is arranged in a shaft groove 9 of the shaft 2. The divided power absorption ring 7 is surrounded by a L-section ring 8. Herein, the divided power absorption ring 7 is divided in a radial direction with respect to a center axis X-X of the shaft 2, such that two half-ring parts result, which are surrounded by the L-section ring 8. The divided power absorption ring 7 and the L-section ring 8 therewith form a detachable shaft shoulder which is configured to absorb axial forces F which are transmitted from the high-pressure region 21 through the mechanical seal assembly. To clarify the forces to be absorbed by this arrangement including the divided ring, FIG. 1 shows a shaft diameter $D_W$ and a hydraulic diameter $D_h$. In this context, the shaft diameter $D_W$ is the diameter of the shaft 2 in the region of the mechanical seal, and the hydraulic diameter $D_h$ is the diameter to be sealed at the mechanical seal by the rotating seal ring 3 and the stationary seal ring 4. Since the chamber 25, in which the pre-tensioning unit 19 is arranged, is also connected to the high-pressure region 21 in the embodiment shown in FIG. 1, the hydraulic diameter $D_h$ is not the maximum contact diameter of the seal rings, but is considerably smaller. Consequently, the divided power absorption ring 7 must be able to absorb a force F acting through an annular surface between the hydraulic diameter $D_h$ and the shaft diameter $D_W$ from the high-pressure region 21.

In order to avoid the distortions, which possibly occur due to the division of the divided power absorption ring 7, in the region of a metal sealing edge 17 between a first sleeve 16 and the rotating seal ring 3 and/or in the region of the sliding surfaces of the seal rings 3 and 4, a compensation ring unit 10 is provided according to the invention. The first sleeve 16 is connected to a second sleeve 18 by means of a plurality of stud bolts 20. The compensation ring unit 10 comprises a first ring 11, a second ring 12 and a third ring 13. The first ring 11 and the second ring 12 are respectively formed as L-section rings having at least one step, wherein the first ring 11 comprises a first step 11b and a second step 11c (see FIG. 2). The second ring 12 comprises only one single step 12b. The third ring 13 is arranged between the first ring 11 and the second ring 12. Herein, the third ring 13 has a rectangular cross-section. As is in particular discernible from FIG. 2, a surface 11a of the first ring 11 directed into the axial direction X-X is in a surface contact with a first axial side of the third ring 13, and a surface 12a of the second ring 12 directed into the axial direction X-X is also in a surface contact with the other axial side of the third ring 13. As is shown in FIG. 2, the two rings 11 and 12 are thus connected in the axial direction X-X through the third ring 13 only.

Therewith, it is secured that a force F transmitted to the first ring 11 through the first sleeve 16 and the second sleeve 18 is exclusively transmitted through the third ring 13 to the second ring 12. The second ring 12 is then directly abutting two-dimensionally at the divided ring 7.

The use of the inventive compensation ring unit 10 between the high-pressure region 21 and the divided ring 7 therewith enables the use of a divided ring without the danger of distortions occurring at other components of the mechanical seal assembly 1. Upon occurrence of an excessively high force F, a plastic deformation of the third ring 13 is performed, which third ring has a lower strength than the two other rings 11 and 12. By the yielding of the third ring 13, undesired waviness introduced through the divided ring 7 can be compensated. Since circumferential gaps 14, 15 between the first ring 11 and the second ring 12 only have a minimum gap width between 0 and 0.035 mm, an extrusion through the circumferential gaps 14, 15 can be avoided in case of a yielding third ring 13.

The third ring 13 is configured such that the following equation is satisfied:

$$S3 < F1 \leq \tfrac{1}{2} \times S1$$

wherein S3 is a yield limit of the third ring 13, F1 is an existing surface pressure upon a maximum pressure in the high-pressure region 21, wherein the surface pressure occurs between the surfaces 11a, 12a directed into the axial direction and the corresponding annular surfaces at the third ring 13, and S1 is a yield limit of the first ring 11 or the second ring 12. Concerning the yield limit, it shall be noted that the yield limit for the first ring 11 and the second ring 12 is equal if the same material is selected; if different materials are selected, the yield limit of the first ring 11 or the second ring 12 being smaller is used for the value S1.

Preferably, the third ring 13 is made of a relatively soft material, such as e.g. an aluminium alloy, and the first ring 11 and the second ring 12 are made of a steel material. The term "yield limit" used in the invention further refers to the point at which a plastic and irreversible deformation of the material occurs when the strength is determined. The differing strength of the rings 11, 12 and 13 of the compensation ring unit 10 is preferably set by determining the tensile strength by means of a tensile test. However, it is also possible that the rings 11, 12 and 13 are determined in view of their compressive strength.

The present invention can be used in single mechanical seal assemblies as well as in dual mechanical seal assemblies. It is preferred that the compensation ring unit 10 is arranged directly adjacent to the divided ring 7. This arrangement has the advantage that the distortion in a component being arranged directly adjacent to the divided ring 7 can be compensated, such that no additional components of the mechanical seal assembly are deformed. As an alternative, also an intermediate part can be used.

The invention claimed is:

1. A mechanical seal assembly, comprising:
    a stationary seal ring connected to a stationary component;
    a rotating seal ring connected to a rotating component, wherein the stationary and rotating seal rings are engaged together to seal between a high pressure region and a low pressure region;
    a divided power absorption ring arranged at the rotating component, wherein the divided power absorption ring is divided in a radial direction into two circumferential half-ring parts; and
    a compensation ring unit comprising a first ring, a second ring and a third ring,
    wherein the first ring and the second ring have a higher strength than the third ring, and
    wherein the compensation ring unit is arranged in a force path defined between the high pressure region and the divided power absorption ring, wherein the first ring comprises a first step and the second ring comprises a second step and the third ring is arranged in an axial direction between the first step and the second step, wherein the inner diameter of the divided power absorption ring is smaller than that of the first, second, and third rings for seating of the divided power absorption ring in a groove of the rotating component to absorb axial forces transmitted from the high pressure region to the divided power absorption ring.

2. The mechanical seal assembly of claim 1, wherein the first and second rings have first and second surfaces facing each other in the axial direction, which surfaces are connected through the third ring.

3. The mechanical seal assembly of claim 1, wherein a strength of the first ring is equal to the strength of the second ring.

4. The mechanical seal assembly of claim 1, wherein the first ring is a multi-step L-section ring having at least two steps.

5. The mechanical seal assembly of claim 1, wherein a minimum inner diameter of the first ring is equal to that of the second ring.

6. The mechanical seal assembly of claim 1, wherein a surface pressure between the first ring and the third ring and/or a surface pressure between the second ring and the third ring is higher than a yield limit of the third ring and smaller than or equal to the half of a yield limit of the first ring or the second ring.

7. The mechanical seal assembly of claim 1, wherein the third ring is made of aluminium or a material containing aluminium and/or that the first and second rings are made of steel.

8. The mechanical seal assembly of claim 1, wherein the compensation ring unit is arranged directly adjacent to the divided power absorption ring and contacts same.

9. The mechanical seal assembly of claim 1, wherein a transmission of a force directed into the axial direction from the first ring to the second ring exclusively occurs through the third ring.

10. The mechanical seal assembly of claim 1, wherein substantially the entire force path between the high pressure region and the divided power absorption ring passes through the third ring.

* * * * *